United States Patent
Duluk, Jr. et al.

(10) Patent No.: US 10,169,072 B2
(45) Date of Patent: Jan. 1, 2019

(54) HARDWARE FOR PARALLEL COMMAND LIST GENERATION

(75) Inventors: Jerome F. Duluk, Jr., Palo Alto, CA (US); Jesse David Hall, Santa Clara, CA (US); Henry Packard Moreton, Woodside, CA (US); Patrick R. Brown, Wake Forest, NC (US)

(73) Assignee: NVIDIA CORPORATION, Santa Clara, CA (US)

( * ) Notice: Subject to any disclaimer, the term of this patent is extended or adjusted under 35 U.S.C. 154(b) by 847 days.

(21) Appl. No.: 12/853,161

(22) Filed: Aug. 9, 2010

(65) Prior Publication Data

US 2011/0072211 A1   Mar. 24, 2011

Related U.S. Application Data

(60) Provisional application No. 61/245,174, filed on Sep. 23, 2009.

(51) Int. Cl.
  *G06F 12/00*  (2006.01)
  *G06F 9/46*   (2006.01)

(52) U.S. Cl.
  CPC .............. *G06F 9/461* (2013.01); *G06F 12/00* (2013.01)

(58) Field of Classification Search
  CPC ...................................................... G06F 12/00
  USPC ....................................................... 711/166
  See application file for complete search history.

(56) References Cited

U.S. PATENT DOCUMENTS

| | | | |
|---|---|---|---|
| 4,885,703 A | | 12/1989 | Deering |
| 5,517,662 A | * | 5/1996 | Coleman et al. ............. 709/201 |
| 5,790,130 A | * | 8/1998 | Gannett .......................... 345/587 |
| 6,269,391 B1 | * | 7/2001 | Gillespie ........................ 718/100 |
| 6,542,921 B1 | | 4/2003 | Sager |
| 6,894,693 B1 | | 5/2005 | Nash |
| 7,447,873 B1 | | 11/2008 | Nordquist |
| 7,584,342 B1 | | 9/2009 | Nordquist |
| 2003/0131214 A1 | | 7/2003 | Downer et al. |
| 2003/0182457 A1 | | 9/2003 | Brewin |
| 2003/0217087 A1 | | 11/2003 | Chase et al. |
| 2003/0225816 A1 | * | 12/2003 | Morrow ................ G06F 9/3851 718/107 |

(Continued)

OTHER PUBLICATIONS

Hand. "A Faster Technique for Rendering Meshes in Multiple Display Systems." Masters Thesis, Mississippi State University [online]. Published May, 2002. [retrieved on Dec. 14, 2010]. Retrieved from: <URL=http://citeseerx.ist.psu.edu/viewdoc/download?doi=10.1.1.11.4315&rep=rep1&type=pdf>.

(Continued)

*Primary Examiner* — Gautam Sain
(74) *Attorney, Agent, or Firm* — Artegis Law Group, LLP

(57) ABSTRACT

A method for providing state inheritance across command lists in a multi-threaded processing environment. The method includes receiving an application program that includes a plurality of parallel threads; generating a command list for each thread of the plurality of parallel threads; causing a first command list associated with a first thread of the plurality of parallel threads to be executed by a processing unit; and causing a second command list associated with a second thread of the plurality of parallel threads to be executed by the processing unit, where the second command list inherits from the first command list state associated with the processing unit.

27 Claims, 11 Drawing Sheets

(56) References Cited

U.S. PATENT DOCUMENTS

| | | | |
|---|---|---|---|
| 2004/0244000 A1* | 12/2004 | Frank et al. | 718/1 |
| 2005/0120194 A1* | 6/2005 | Kissell | 712/242 |
| 2005/0240936 A1* | 10/2005 | Jones et al. | 718/107 |
| 2007/0006231 A1* | 1/2007 | Wang | G06F 9/30003 718/100 |
| 2007/0136730 A1 | 6/2007 | Wilt et al. | |
| 2008/0109795 A1* | 5/2008 | Buck et al. | 717/137 |
| 2008/0211803 A1* | 9/2008 | Kaneko | 345/418 |
| 2009/0002380 A1* | 1/2009 | Langyel | G06T 15/005 345/522 |
| 2010/0013842 A1* | 1/2010 | Green | G06T 15/005 345/522 |
| 2010/0149184 A1 | 6/2010 | Pepper et al. | |

OTHER PUBLICATIONS

International Search Report, PCT Appl. No. PCT/US 10/49961, dated Dec. 29, 2010.

Non-Final Office Action dated Dec. 14, 2012, for U.S. Appl. No. 12/868,596.

NVIDIA: CUDA Programming Model Overview. 2008. URL:http://www.sdsc.edu/us/training/assets/docs/NVIDIA-02-BasicsOfCUDA.pdf [called up on Oct. 28, 2013].

Loop, C.; Eisenacher, C.: Real-time patch-based sort-middle rendering on massively parallel hardware, Tech. Rep MSR-TR-2009-83, Microsoft Research. URL: research.microsoft.com/en - us/um/people/cloop/msrtr - 2009 - 83.pdf [called up on Oct. 28, 2013].

Andersson, J.: Parallel Graphics in Frostbite—Current & Future. In: SIGGRAPH 2009: Beyond Programmable Shading, Jun. 8, 2009. URL: http://s09.idav.ucdavis.edu/talks104 - JAndresson - ParallelFrostbite - Siggraph09.pdf [called up on Oct. 28, 2013].

NVIDIA: Optimizing CUDA, Monash GPI Computing Workshop. May 28, 2009. URL: https://confluencevre.its.monash.edu.au/download/attachments/6753417/04a_Optimizing_CUDA_full.pdf [called up on Oct. 28, 2013].

Thread pool pattern. In: Wikipedia, the free encyclopedia. Stage of editing: May 9, 2009. URL: http://en.wikipedia.org/w/index.php?title=Thread_pool_pattern&oldid=311970547 [called up on Oct. 28, 2013].

Microsoft: What's New in the Nov. 2008 Direct3D 11. Technical Preview. 2008. URL: http://msdn.microsoft.com/enus/library/windows/desktop/ff476343%28v=vs85%28.aspx [called upon Oct. 30, 2013].

Translation of German Examination Report for German Application No. 112010003750.7 dated Nov. 4, 2013.

* cited by examiner

HARDWARE FOR PARALLEL COMMAND LIST GENERATION

CROSS-REFERENCE TO RELATED APPLICATIONS

This application claims benefit of U.S. provisional patent application Ser. No. 61/245,174, filed on Sep. 23, 2009.

BACKGROUND

Field of the Invention

The present invention relates to processing units and, in particular, to hardware for parallel command list generation.

Description of the Related Art

Microsoft® Direct3D 11 (DX11) is an API (Application Programming Interface) that supports tessellation and allows for improved multi-threading to assist developers in developing applications that better utilize multi-core processors.

In DX11, each core of a CPU (central processing unit) can execute threads of commands in parallel. Each core, or different threads on the same core, generates a separate command list via its own copy of a user-mode driver to increase performance of the software application. A command list is an API-level abstraction of a command buffer, which is a lower-level concept. The driver builds up a command buffer as it receives API commands from the application; a command list is manifested by a completed command buffer plus any additional implementation-defined meta information. The contents of a command list or command buffer are typically executed by a GPU (graphics processing unit). There is a single thread running on one of the CPU cores that submits command lists for execution in a particular order. The order of the command lists, and therefore the order of the command buffers, is determined by the application program. Command buffers are fed into the core via pushbuffers. The command buffers are composed of methods to be executed by the core, typically a GPU.

However, DX11 does not allow processor state inheritance across command lists. Instead, the processor state is reset at the beginning of every command list to a so-called "clean slate state." That means that each user-mode driver thread sets all the state parameters in the processor at the beginning of the command list. Not providing state inheritance across command lists provides a significant drawback since threads cannot cooperate when executing the application program. Moreover, the added processing cost of resetting the processor state to the clean slate state using dozens or hundreds of commands adds inefficiencies to the system, thereby reducing overall performance.

As the foregoing illustrates, there is a need in the art for an improved technique that addresses the limitations of current approaches set forth above.

SUMMARY

One embodiment of the invention provides a method for providing state inheritance across command lists in a multi-threaded processing environment. The method includes receiving an application program that includes a plurality of parallel threads; generating a command list for each thread of the plurality of parallel threads; causing a first command list associated with a first thread of the plurality of parallel threads to be executed by a processing unit; and causing a second command list associated with a second thread of the plurality of parallel threads to be executed by the processing unit, where the second command list inherits from the first command list state associated with the processing unit.

Another embodiment of the invention provides a method for providing an initial default state for a multi-threaded processing environment. The method includes receiving an application program that includes a plurality of parallel threads; generating a command list for each thread of the plurality of parallel threads; inserting an unbind method into a first command list associated with a first thread of the plurality of parallel threads to be executed by a processing unit, where the unbind method is a command to be executed by the processing unit; causing the unbind method to be executed by the processing unit, resulting in each parameter of the state of a processing unit being reset; and causing commands included in the first command list to be executed by the processing unit after the unbind method is executed.

One advantage provided by embodiments of the invention is that better processing efficiency is achieved relative to prior art techniques.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

System Overview

Figure 1:
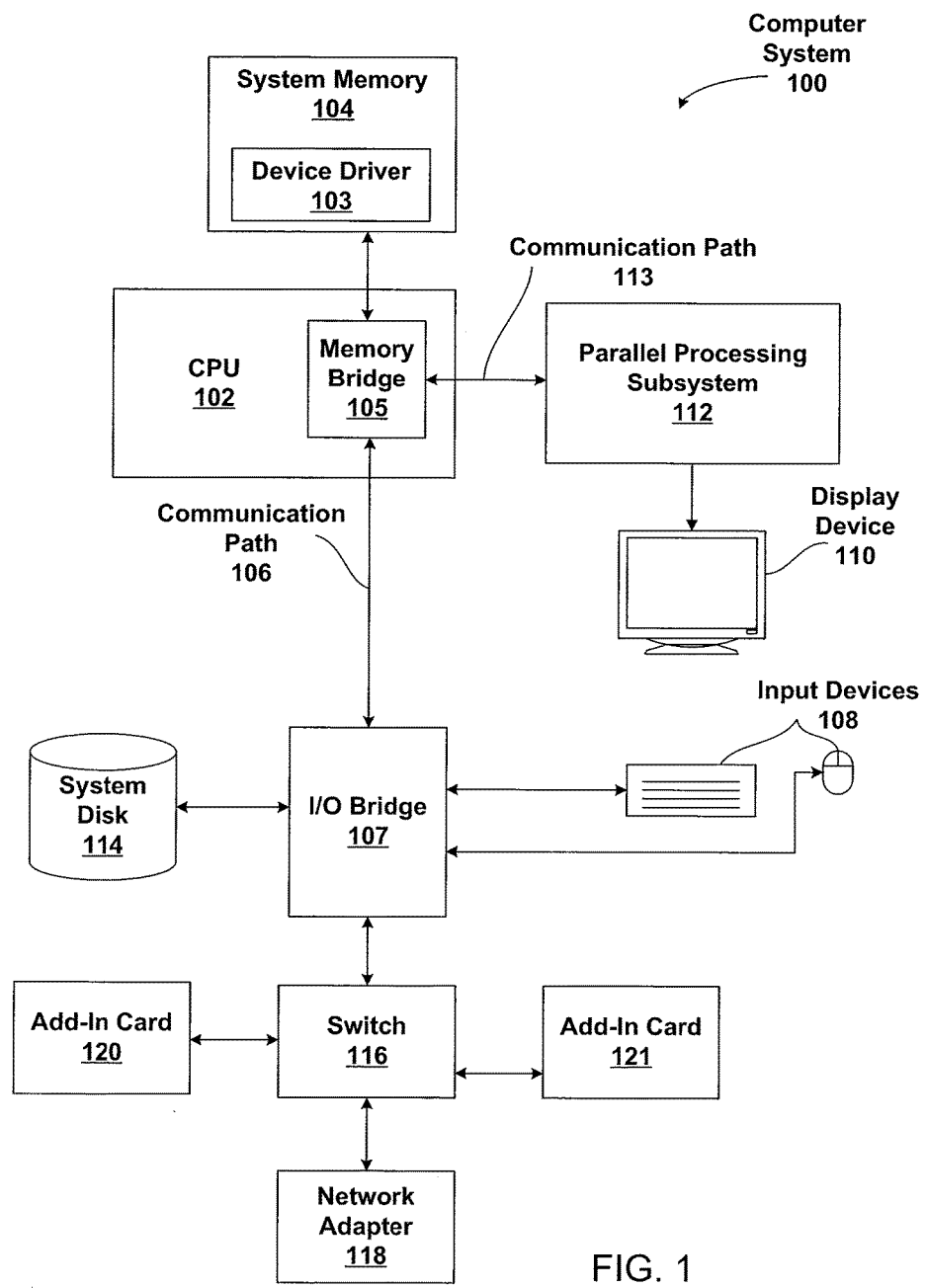
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 communicating via a bus path through a memory bridge 105. The DX11 multi-threading features are primarily aimed at multi-core CPUs. Thus, in some embodiments, the CPU 102 is a multi-core CPU. Memory bridge 105 may be integrated into CPU 102 as shown in FIG. 1. Alternatively, memory bridge 105, may be a conventional device, e.g., a Northbridge chip, that is connected via a bus to CPU 102. Memory bridge 105 is connected via communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via path 106 and memory bridge 105. A parallel processing subsystem 112 is coupled to memory bridge 105 via a bus or other communication path 113 (e.g., a PCI Express, Accelerated Graphics Port, or HyperTransport link); in one embodiment parallel processing subsystem 112 is a graphics subsystem that delivers pixels to a display device 110 (e.g., a conventional CRT or LCD based monitor). A system disk 114 is also connected to I/O bridge 107. A switch 116 provides connections between I/O bridge 107 and other components such as a network adapter 118 and various add-in cards 120 and 121. Other components (not explicitly shown), including USB or other port connections, CD drives, DVD drives, film recording devices, and the like, may also be connected to I/O bridge 107. Communication paths interconnecting the various components in FIG. 1 may be implemented using any suitable protocols, such as PCI (Peripheral Component Interconnect), PCI-Express (PCI-E), AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements, such as the memory bridge 105, CPU 102, and I/O bridge 107 to form a system on chip (SoC).

It will be appreciated that the system shown herein is illustrative and that variations and modifications are possible. The connection topology, including the number and arrangement of bridges, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, one or more of CPU 102, I/O bridge 107, parallel processing subsystem 112, and memory bridge 105 may be integrated into one or more chips. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
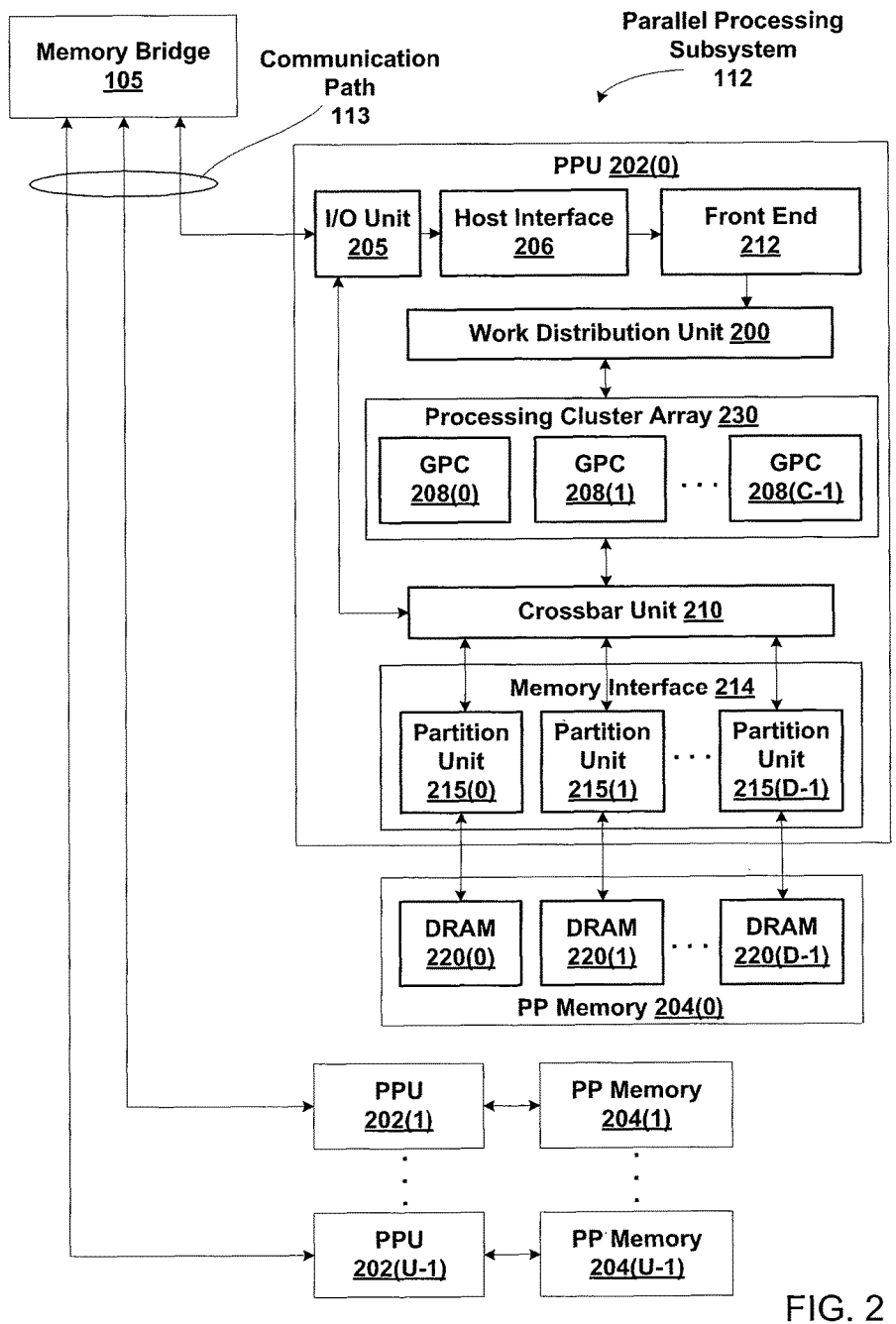
FIG. 2 is a block diagram of a parallel processing subsystem for the computer system of FIG. 1, according to one embodiment of the present invention.

FIG. 2 illustrates a parallel processing subsystem 112, according to one embodiment of the present invention. As shown, parallel processing subsystem 112 includes one or more parallel processing units (PPUs) 202, each of which is coupled to a local parallel processing (PP) memory 204. In general, a parallel processing subsystem includes a number U of PPUs, where U≥1. (Herein, multiple instances of like objects are denoted with reference numbers identifying the object and parenthetical numbers identifying the instance where needed.) PPUs 202 and parallel processing memories 204 may be implemented using one or more integrated circuit devices, such as programmable processors, application specific integrated circuits (ASICs), or memory devices, or in any other technically feasible fashion.

Referring again to FIG. 1, in some embodiments, some or all of PPUs 202 in parallel processing subsystem 112 are graphics processors with rendering pipelines that can be configured to perform various tasks related to generating pixel data from graphics data supplied by CPU 102 and/or system memory 104, interacting with local parallel processing memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general-purpose computations. The PPUs may be identical or different, and each PPU may have its own dedicated parallel processing memory device(s) or no dedicated parallel processing memory device(s). One or more PPUs 202 may output data to display device 110 or each PPU 202 may output data to one or more display devices 110.

In operation, CPU 102 is the master processor of computer system 100, controlling and coordinating operations of other system components. In particular, CPU 102 issues commands that control the operation of PPUs 202. In some embodiments, CPU 102 writes a stream of commands for each PPU 202 to a command buffer (not explicitly shown in either FIG. 1 or FIG. 2) that may be located in system memory 104, parallel processing memory 204, or another storage location accessible to both CPU 102 and PPU 202. PPU 202 reads the command stream from the command buffer and then executes commands asynchronously relative to the operation of CPU 102. CPU 102 may also create data buffers that PPUs 202 may read in response to commands in the command buffer. Each command and data buffer may be read by each of PPUs 202.

Referring back now to FIG. 2, each PPU 202 includes an I/O (input/output) unit 205 that communicates with the rest of computer system 100 via communication path 113, which connects to memory bridge 105 (or, in one alternative embodiment, directly to CPU 102). The connection of PPU 202 to the rest of computer system 100 may also be varied. In some embodiments, parallel processing subsystem 112 is implemented as an add-in card that can be inserted into an expansion slot of computer system 100. In other embodiments, a PPU 202 can be integrated on a single chip with a bus bridge, such as memory bridge 105 or I/O bridge 107.

In still other embodiments, some or all elements of PPU 202 may be integrated on a single chip with CPU 102.

In one embodiment, communication path 113 is a PCI-Express link, in which dedicated lanes are allocated to each PPU 202, as is known in the art. Other communication paths may also be used. An I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to parallel processing memory 204) may be directed to a memory crossbar unit 210. Host interface 206 reads each command buffer and outputs the work specified by the command buffer to a front end 212.

Each PPU 202 advantageously implements a highly parallel processing architecture. As shown in detail, PPU 202(0) includes a processing cluster array 230 that includes a number C of general processing clusters (GPCs) 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. For example, in a graphics application, a first set of GPCs 208 may be allocated to perform tessellation operations and to produce primitive topologies for patches, and a second set of GPCs 208 may be allocated to perform tessellation shading to evaluate patch parameters for the primitive topologies and to determine vertex positions and other per-vertex attributes. The allocation of GPCs 208 may vary depending on the workload arising for each type of program or computation. Alternatively, GPCs 208 may be allocated to perform processing tasks using a time-slice scheme to switch between different processing tasks.

GPCs 208 receive processing tasks to be executed via a work distribution unit 200, which receives commands defining processing tasks from front end unit 212. Processing tasks include pointers to data to be processed, e.g., surface (patch) data, primitive data, vertex data, and/or pixel data, as well as state parameters and commands defining how the data is to be processed (e.g., what program is to be executed). Work distribution unit 200 may be configured to fetch the pointers corresponding to the processing tasks, may receive the pointers from front end 212, or may receive the data directly from front end 212. In some embodiments, indices specify the location of the data in an array. Front end 212 ensures that GPCs 208 are configured to a valid state before the processing specified by the command buffers is initiated.

When PPU 202 is used for graphics processing, for example, the processing workload for each patch is divided into approximately equal sized tasks to enable distribution of the tessellation processing to multiple GPCs 208. A work distribution unit 200 may be configured to output tasks at a frequency capable of providing tasks to multiple GPCs 208 for processing. In some embodiments of the present invention, portions of GPCs 208 are configured to perform different types of processing. For example a first portion may be configured to perform vertex shading and topology generation, a second portion may be configured to perform tessellation and geometry shading, and a third portion may be configured to perform pixel shading in screen space to produce a rendered image. The ability to allocate portions of GPCs 208 for performing different types of processing tasks efficiently accommodates any expansion and contraction of data produced by those different types of processing tasks. Intermediate data produced by GPCs 208 may be buffered to allow the intermediate data to be transmitted between GPCs 208 with minimal stalling in cases where the rate at which data is accepted by a downstream GPC 208 lags the rate at which data is produced by an upstream GPC 208.

Memory interface 214 may be partitioned into a number D of memory partition units that are each coupled to a portion of parallel processing memory 204, where D≥1. Each portion of parallel processing memory 204 generally includes one or more memory devices (e.g DRAM 220). Persons skilled in the art will appreciate that DRAM 220 may be replaced with other suitable storage devices and can be of generally conventional design. A detailed description is therefore omitted. Render targets, such as frame buffers or texture maps may be stored across DRAMs 220, allowing partition units 215 to write portions of each render target in parallel to efficiently use the available bandwidth of parallel processing memory 204.

Any one of GPCs 208 may process data to be written to any of the DRAMs 220 within parallel processing memory 204. Crossbar unit 210 is configured to route the output of each GPC 208 to the input of any partition unit 215 or to another GPC 208 for further processing. GPCs 208 communicate with memory interface 214 through crossbar unit 210 to read from or write to various external memory devices. In one embodiment, crossbar unit 210 has a connection to memory interface 214 to communicate with I/O unit 205, as well as a connection to local parallel processing memory 204, thereby enabling the processing cores within the different GPCs 208 to communicate with system memory 104 or other memory that is not local to PPU 202. Crossbar unit 210 may use virtual channels to separate traffic streams between the GPCs 208 and partition units 215.

Again, GPCs 208 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. PPUs 202 may transfer data from system memory 104 and/or local parallel processing memories 204 into internal (on-chip) memory, process the data, and write result data back to system memory 104 and/or local parallel processing memories 204, where such data can be accessed by other system components, including CPU 102 or another parallel processing subsystem 112.

A PPU 202 may be provided with any amount of local parallel processing memory 204, including no local memory, and may use local memory and system memory in any combination. For instance, a PPU 202 can be a graphics processor in a unified memory architecture (UMA) embodiment. In such embodiments, little or no dedicated graphics (parallel processing) memory would be provided, and PPU 202 would use system memory exclusively or almost exclusively. In UMA embodiments, a PPU 202 may be integrated into a bridge chip or processor chip or provided as a discrete chip with a high-speed link (e.g., PCI-Express) connecting the PPU 202 to system memory via a bridge chip or other communication means.

As noted above, any number of PPUs 202 can be included in a parallel processing subsystem 112. For instance, multiple PPUs 202 can be provided on a single add-in card, or multiple add-in cards can be connected to communication path 113, or one or more PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

Processing Cluster Array Overview

Figure 3A:
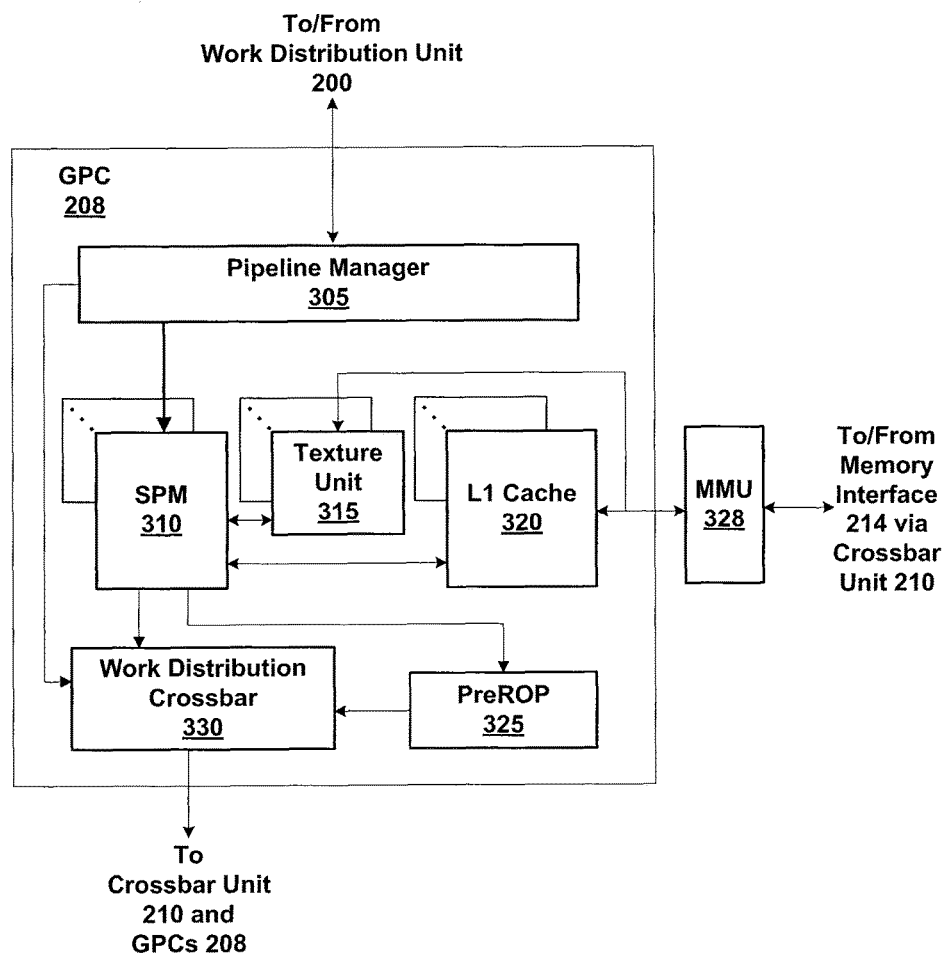
FIG. 3A is a block diagram of a GPC within one of the PPUs of FIG. 2, according to one embodiment of the present invention.

FIG. 3A is a block diagram of a GPC 208 within one of the PPUs 202 of FIG. 2, according to one embodiment of the present invention. Each GPC 208 may be configured to execute a large number of threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within each one of the GPCs 208. Unlike a SIMD execution regime, where all processing engines typically execute identical instructions, SIMT execution allows different threads to more readily follow divergent execution paths through a given thread program. Persons skilled in the art will understand that a SIMD processing regime represents a functional subset of a SIMT processing regime.

In graphics applications, a GPC 208 may be configured to implement a primitive engine for performing screen space graphics processing functions that may include, but are not limited to primitive setup, rasterization, and z culling. The primitive engine receives a processing task from work distribution unit 200, and when the processing task does not require the operations performed by primitive engine, the processing task is passed through the primitive engine to a pipeline manager 305. Operation of GPC 208 is advantageously controlled via a pipeline manager 305 that distributes processing tasks to streaming multiprocessors (SPMs) 310. Pipeline manager 305 may also be configured to control a work distribution crossbar 330 by specifying destinations for processed data output by SPMs 310.

In one embodiment, each GPC 208 includes a number M of SPMs 310, where M≥1, each SPM 310 configured to process one or more thread groups. The series of instructions transmitted to a particular GPC 208 constitutes a thread, as previously defined herein, and the collection of a certain number of concurrently executing threads across the parallel processing engines (not shown) within an SPM 310 is referred to herein as a "thread group." As used herein, a "thread group" refers to a group of threads concurrently executing the same program on different input data, with each thread of the group being assigned to a different processing engine within an SPM 310. A thread group may include fewer threads than the number of processing engines within the SPM 310, in which case some processing engines will be idle during cycles when that thread group is being processed. A thread group may also include more threads than the number of processing engines within the SPM 310, in which case processing will take place over multiple clock cycles. Since each SPM 310 can support up to G thread groups concurrently, it follows that up to G×M thread groups can be executing in GPC 208 at any given time.

Additionally, a plurality of related thread groups may be active (in different phases of execution) at the same time within an SPM 310. This collection of thread groups is referred to herein as a "cooperative thread array" ("CTA"). The size of a particular CTA is equal to m*k, where k is the number of concurrently executing threads in a thread group and is typically an integer multiple of the number of parallel processing engines within the SPM 310, and m is the number of thread groups simultaneously active within the SPM 310. The size of a CTA is generally determined by the programmer and the amount of hardware resources, such as memory or registers, available to the CTA.

An exclusive local address space is available to each thread, and a shared per-CTA address space is used to pass data between threads within a CTA. Data stored in the per-thread local address space and per-CTA address space is stored in L1 cache 320, and an eviction policy may be used to favor keeping the data in L1 cache 320. Each SPM 310 uses space in a corresponding L1 cache 320 that is used to perform load and store operations. Each SPM 310 also has access to L2 caches within the partition units 215 that are shared among all GPCs 208 and may be used to transfer data between threads. Finally, SPMs 310 also have access to off-chip "global" memory, which can include, e.g., parallel processing memory 204 and/or system memory 104. An L2 cache may be used to store data that is written to and read from global memory. It is to be understood that any memory external to PPU 202 may be used as global memory.

Also, each SPM 310 advantageously includes an identical set of functional units (e.g., arithmetic logic units, etc.) that may be pipelined, allowing a new instruction to be issued before a previous instruction has finished, as is known in the art. Any combination of functional units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional-unit hardware can be leveraged to perform different operations.

Each GPC 208 may include a memory management unit (MMU) 328 that is configured to map virtual addresses into physical addresses. In other embodiments, MMU(s) 328 may reside within the memory interface 214. The MMU 328 includes a set of page table entries (PTEs) used to map a virtual address to a physical address of a tile and optionally a cache line index. The physical address is processed to distribute surface data access locality to allow efficient request interleaving among partition units. The cache line index may be used to determine whether of not a request for a cache line is a hit or miss.

In graphics applications, a GPC 208 may be configured such that each SPM 310 is coupled to a texture unit 315 for performing texture mapping operations, e.g., determining texture sample positions, reading texture data, and filtering the texture data. Texture data is read via memory interface 214 and is fetched from an L2 cache, parallel processing memory 204, or system memory 104, as needed. Texture unit 315 may be configured to store the texture data in an internal cache. In some embodiments, texture unit 315 is coupled to L1 cache 320, and texture data is stored in L1 cache 320. Each SPM 310 outputs processed tasks to work distribution crossbar 330 in order to provide the processed task to another GPC 208 for further processing or to store the processed task in an L2 cache, parallel processing memory 204, or system memory 104 via crossbar unit 210. A preROP (pre-raster operations) 325 is configured to receive data from SPM 310, direct data to ROP units within partition units 215, and perform optimizations for color blending, organize pixel color data, and perform address translations.

It will be appreciated that the core architecture described herein is illustrative and that variations and modifications are possible. Any number of processing engines, e.g., primitive engines, SPMs 310, texture units 315, or preROPs 325 may be included within a GPC 208. Further, while only one GPC 208 is shown, a PPU 202 may include any number of GPCs 208 that are advantageously functionally similar to one another so that execution behavior does not depend on which GPC 208 receives a particular processing task. Further, each GPC 208 advantageously operates independently of other GPCs 208 using separate and distinct processing engines, L1 caches 320, and so on.

Figure 3B:
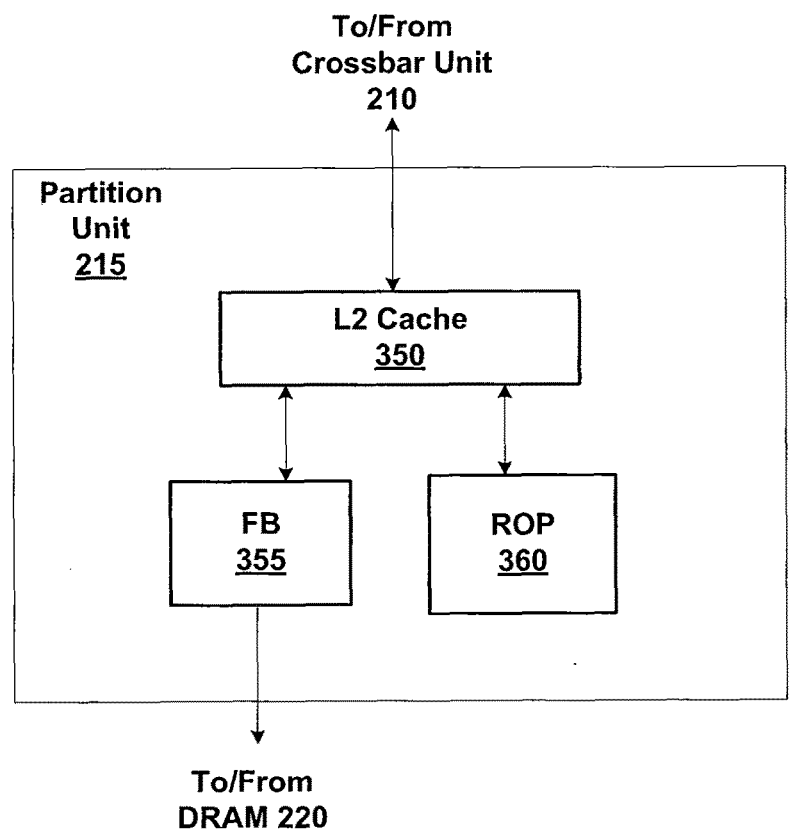
FIG. 3B is a block diagram of a partition unit within one of the PPUs of FIG. 2, according to one embodiment of the present invention.

FIG. 3B is a block diagram of a partition unit 215 within one of the PPUs 202 of FIG. 2, according to one embodiment of the present invention. As shown, partition unit 215 includes a L2 cache 350, a frame buffer (FB) 355, and a raster operations unit (RO) 360. L2 cache 350 is a read/write cache that is configured to perform load and store operations received from crossbar unit 210 and ROP 360. Read misses and urgent writeback requests are output by L2 cache 350 to FB 355 for processing. Dirty updates are also sent to FB 355 for opportunistic processing. FB 355 interfaces directly with DRAM 220, outputting read and write requests and receiving data read from DRAM 220.

In graphics applications, ROP 360 is a processing unit that performs raster operations, such as stencil, z test, blending, and the like, and outputs pixel data as processed graphics data for storage in graphics memory. In some embodiments of the present invention, ROP 360 is included within each GPC 208 instead of partition unit 215, and pixel read and write requests are transmitted over crossbar unit 210 instead of pixel fragment data.

The processed graphics data may be displayed on display device 110 or routed for further processing by CPU 102 or by one of the processing entities within parallel processing subsystem 112. Each partition unit 215 includes a ROP 360 in order to distribute processing of the raster operations. In some embodiments, ROP 360 may be configured to compress z or color data that is written to memory and decompress z or color data that is read from memory.

Persons skilled in the art will understand that the architecture described in FIGS. 1, 2, 3A and 3B in no way limits the scope of the present invention and that the techniques taught herein may be implemented on any properly configured processing unit, including, without limitation, one or more CPUs, one or more multi-core CPUs, one or more PPUs 202, one or more GPCs 208, one or more graphics or special purpose processing units, or the like, without departing the scope of the present invention.

Figure 4:
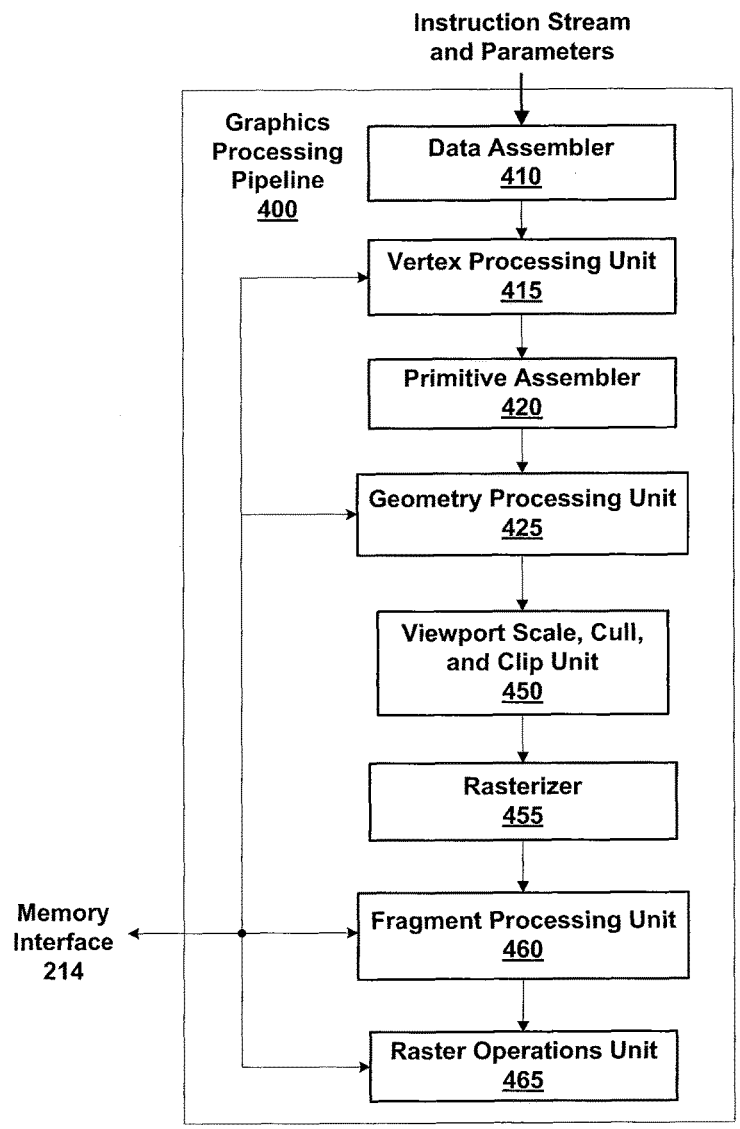
FIG. 4 is a conceptual diagram of a graphics processing pipeline that one or more of the PPUs of FIG. 2 can be configured to implement, according to one embodiment of the present invention.

FIG. 4 is a conceptual diagram of a graphics processing pipeline 400, that one or more of the PPUs 202 of FIG. 2 can be configured to implement, according to one embodiment of the present invention. For example, one of the SPMs 310 may be configured to perform the functions of one or more of a vertex processing unit 415, a geometry processing unit 425, and a fragment processing unit 460. The functions of data assembler 410, primitive assembler 420, rasterizer 455, and raster operations unit 465 may also be performed by other processing engines within a GPC 208 and a corresponding partition unit 215. Alternately, graphics processing pipeline 400 may be implemented using dedicated processing units for one or more functions.

Data assembler 410 processing unit collects vertex data for high-order surfaces, primitives, and the like, and outputs the vertex data, including the vertex attributes, to vertex processing unit 415. Vertex processing unit 415 is a programmable execution unit that is configured to execute vertex shader programs, lighting and transforming vertex data as specified by the vertex shader programs. For example, vertex processing unit 415 may be programmed to transform the vertex data from an object-based coordinate representation (object space) to an alternatively based coordinate system such as world space or normalized device coordinates (NDC) space. Vertex processing unit 415 may read data that is stored in L1 cache 320, parallel processing memory 204, or system memory 104 by data assembler 410 for use in processing the vertex data.

Primitive assembler 420 receives vertex attributes from vertex processing unit 415, reading stored vertex attributes, as needed, and constructs graphics primitives for processing by geometry processing unit 425. Graphics primitives include triangles, line segments, points, and the like. Geometry processing unit 425 is a programmable execution unit that is configured to execute geometry shader programs, transforming graphics primitives received from primitive assembler 420 as specified by the geometry shader programs. For example, geometry processing unit 425 may be programmed to subdivide the graphics primitives into one or more new graphics primitives and calculate parameters, such as plane equation coefficients, that are used to rasterize the new graphics primitives.

In some embodiments, geometry processing unit 425 may also add or delete elements in the geometry stream. Geometry processing unit 425 outputs the parameters and vertices specifying new graphics primitives to a viewport scale, cull, and clip unit 450. Geometry processing unit 425 may read data that is stored in parallel processing memory 204 or system memory 104 for use in processing the geometry data. Viewport scale, cull, and clip unit 450 performs clipping, culling, and viewport scaling and outputs processed graphics primitives to a rasterizer 455.

Rasterizer 455 scan converts the new graphics primitives and outputs fragments and coverage data to fragment processing unit 460. Additionally, rasterizer 455 may be configured to perform z culling and other z-based optimizations.

Fragment processing unit 460 is a programmable execution unit that is configured to execute fragment shader programs, transforming fragments received from rasterizer 455, as specified by the fragment shader programs. For example, fragment processing unit 460 may be programmed to perform operations such as perspective correction, texture mapping, shading, blending, and the like, to produce shaded fragments that are output to raster operations unit 465. Fragment processing unit 460 may read data that is stored in parallel processing memory 204 or system memory 104 for use in processing the fragment data. Fragments may be shaded at pixel, sample, or other granularity, depending on the programmed sampling rate.

Raster operations unit 465 is a processing unit that performs raster operations, such as stencil, z test, blending, and the like, and outputs pixel data as processed graphics data for storage in graphics memory. The processed graphics data may be stored in graphics memory, e.g., parallel processing memory 204, and/or system memory 104, for display on display device 110 or for further processing by CPU 102 or parallel processing subsystem 112. In some embodiments of the present invention, raster operations unit 465 is configured to compress z or color data that is written to memory and decompress z or color data that is read from memory.

Hardware for Parallel Command List Generation

Embodiments of the invention are related to carrying over the processor state from one command list to the next in a multi-threaded processing system. That is, the state in the processor, such as a GPU or CPU, is accumulated across multiple command lists. This feature is also referred to as "state inheritance across command lists." State inheritance across command lists presents a significant problem for the driver because the decision of which methods to put into the command list is dependent on the GPU state at the time the method is executed in the GPU. The GPU state is, in essence, the accumulated state present in all command buffers that have previously executed. However, the GPU state could be set in a previous command buffer generated by a different driver thread that has not yet completed building that previous command buffer. Embodiments of the invention either remove the dependency on unknown inherited state or update state-dependent portions of command buffers once the inherited state is known.

In one embodiment, the processing state is defined as the set of parameters associated with a processing unit that executes commands. Examples of parameters included in the processing state include a selection of a vertex shader, a geometry shader, a pixel shader, or the like, one or more parameters defining a set of different textures bound to the pixel shader, a parameter defining how blending is performed, a list of target rendering surfaces, among others. A "method," as used herein, is a command sent to the processing hardware that sets one or more of the parameters defining the processor state. In one implementation, setting the processor state defines how different processing stages execute subsequent commands.

Embodiments of the invention attempt to eliminate the situations where the methods put into a command list are dependent on the current state in the execution-order of all the command lists of the GPU. This feature is referred to as "making the driver stateless," in that the driver does not need to consider the current GPU state when generating a command list.

Another motivation for embodiments of the invention is to reduce the CPU overhead of submitting rendering commands from the application to the hardware, i.e., to keep the CPU from becoming a bottleneck. The reason for this overhead is that it takes time to examine the current state to determine which methods to send. Less overhead is required if the methods can be written without having to inspect current state.

In one embodiment, there is one master thread and multiple worker threads per processing device. For example, this 1-master/N-workers arrangement may be determined by the application. Each worker thread "owns" a command list that is associated with commands to be executed by the processing device. In some embodiments, the processing device comprises the PPU 202 or a CPU core. The worker threads concurrently fill their command lists by making API calls (e.g., state changes, draw commands, etc.) into the driver. As command lists are completed, the command lists are handed to the master thread, which orders them and submits them to the driver/hardware. In some embodiments, command lists may be submitted multiple times.

At least at first glance, implementing this model requires that the driver be "stateless," meaning that any device driver interface (DDI) entry point can be fully handled and translated into methods without reference to the "current" API or processor state. In one embodiment, each DDI entry point could simply be encoded into a command token and argument data, which would be appended to a buffer associated with the command list. When the command list is scheduled for execution, these tokens could be interpreted and converted to methods/commands in the pushbuffer. However, this approach suffers from bottleneck issues in the multi-threaded command list generation since much of the processing work needed to achieve this result would still occur serially in a single thread.

In one embodiment, each command list includes of a tokenized command queue, as well one or more associated GPU-readable command buffer segments. Many DDI entry points are stateless, and would just append to the command buffer. One of the command tokens could be "append the next N command buffer bytes." Other commands may be required for state-dependent processing. For example, this processing could happen on the master thread when the command list is submitted, and its results spliced into the method stream seen by the hardware.

In one embodiment, each command list inherits any state left over from the command list executed before the current command list is executed. This means that while the command list is being generated, the initial state may not be known and that state might even be different each time the command list is executed, i.e., if the ordering of command lists changes. In this case, the driver does not always know the current API state at all times while building a command list.

In one embodiment, an indirection is inserted between resource references in a command list and the actual resources that the command list uses. The binding of references to the real resources happens when the command list is submitted, and could change between submissions.

Figure 5:
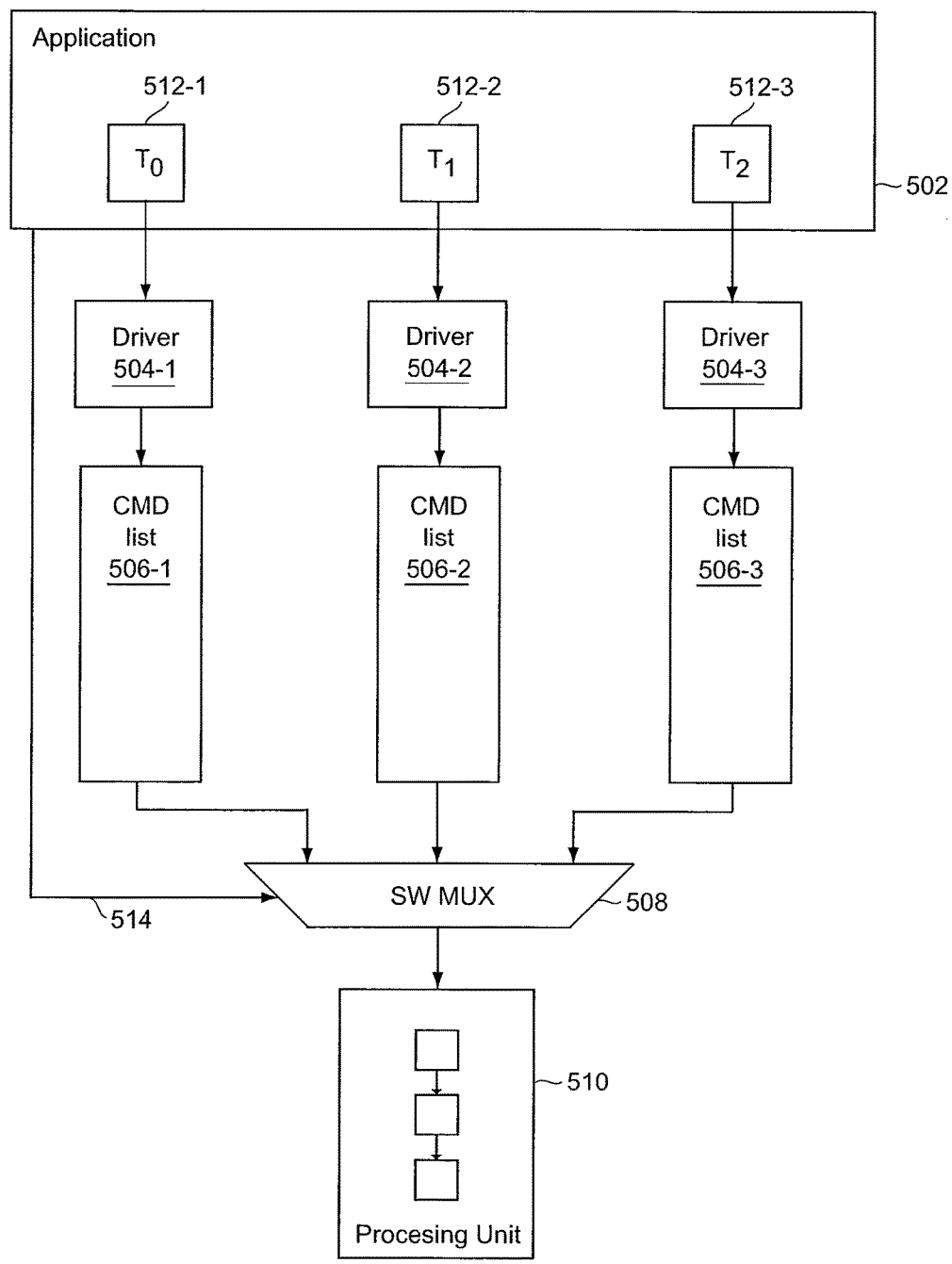
FIG. 5 is a conceptual diagram illustrating multi-threaded processing using parallel command lists, according to one embodiment of the invention.

FIG. 5 is a conceptual diagram illustrating multi-threaded processing using parallel command lists, according to one embodiment of the invention. As shown, a software application written by an application developer may be divided into multiple threads 512-1, 512-2, 512-3. Each thread 512-1, 512-2, 512-3 is associated with a different driver 504-1, 504-2, 504-3, respectively. Each driver 504-1, 504-2, 504-3 is associated with a different command list 506-1, 506-2, 506-3, respectively. The threads that build the command lists are executed on CPU cores as determined by the application and operating system. Once the threads have completed building their command lists, the command lists are submitted or scheduled for execution by the processing unit 510, such as a GPU. The command list submission step is performed via the software multiplexor 508 at the control of the application 502 via signal 514.

Figure 6:
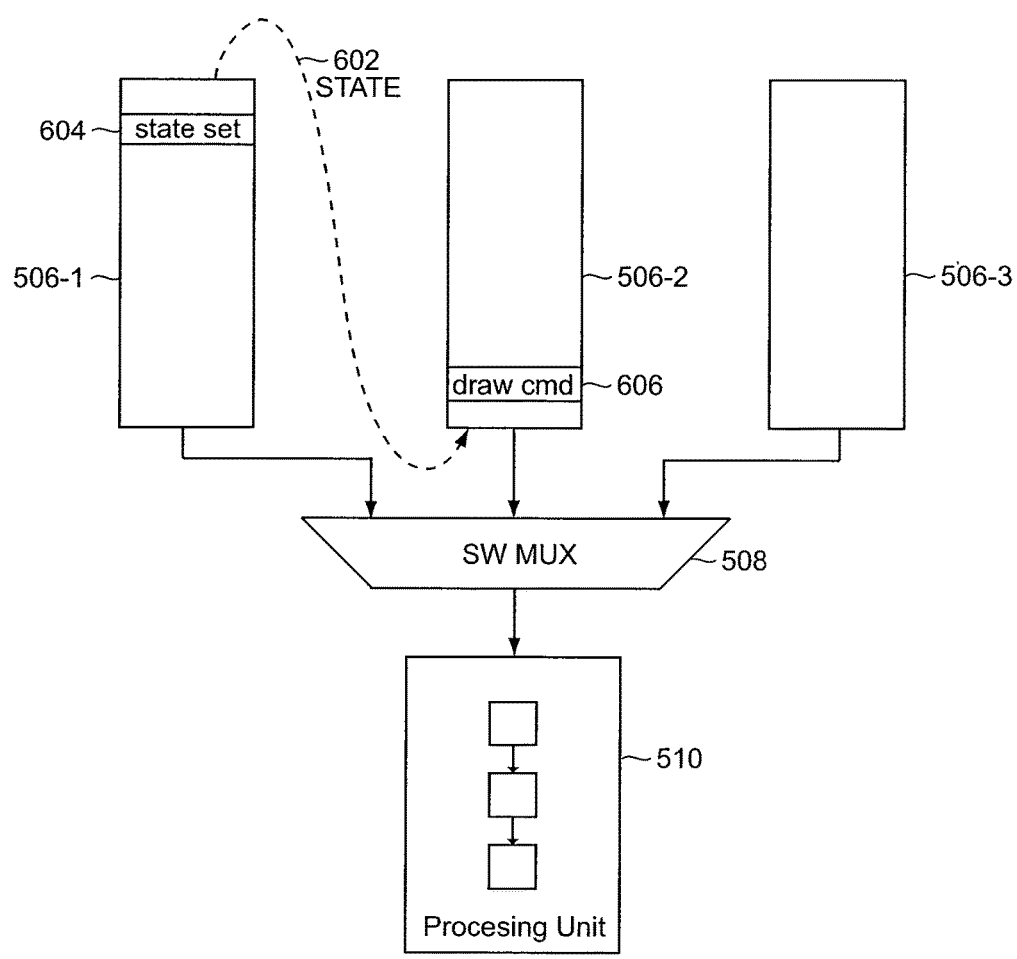
FIG. 6 is a conceptual diagram that illustrates state inheritance across command lists, according to one embodiment of the invention.

FIG. 6 is a conceptual diagram that illustrates state inheritance across command lists, according to one embodiment of the invention. As described, when implementing state inheritance across command lists, a problem may arise when the state is set near the end of the execution of one thread and a command that depends on the state is to be executed near the beginning of another command list. An example of a command that depends on the state is a draw command.

In the example shown in FIG. 6, let us assume that command list 506-1 is executed first, followed by executing command list 506-2. As shown in FIG. 6, a state of the processing unit 510 is set by one or more commands 604 near the end of executing command list 506-1. When implementing state inheritance across command lists, the state of the processing unit 510 is carried over to the execution of command list 506-2, indicated by path 602. A draw command 606 may be included in command list 506-2 near the beginning of the command list 506-2. Since the threads 512-1 and 512-2, associated with command buffers 506-1 and 506-2, respectively, may be unrelated threads, carrying over the state to thread 512-2 may cause errors when no remedial action is taken to ensure that the state is set properly when the draw command 606 is executed. As described in greater detail herein, embodiments of the invention allow for state inheritance across command lists to be implemented efficiently and without errors.

Figure 7:
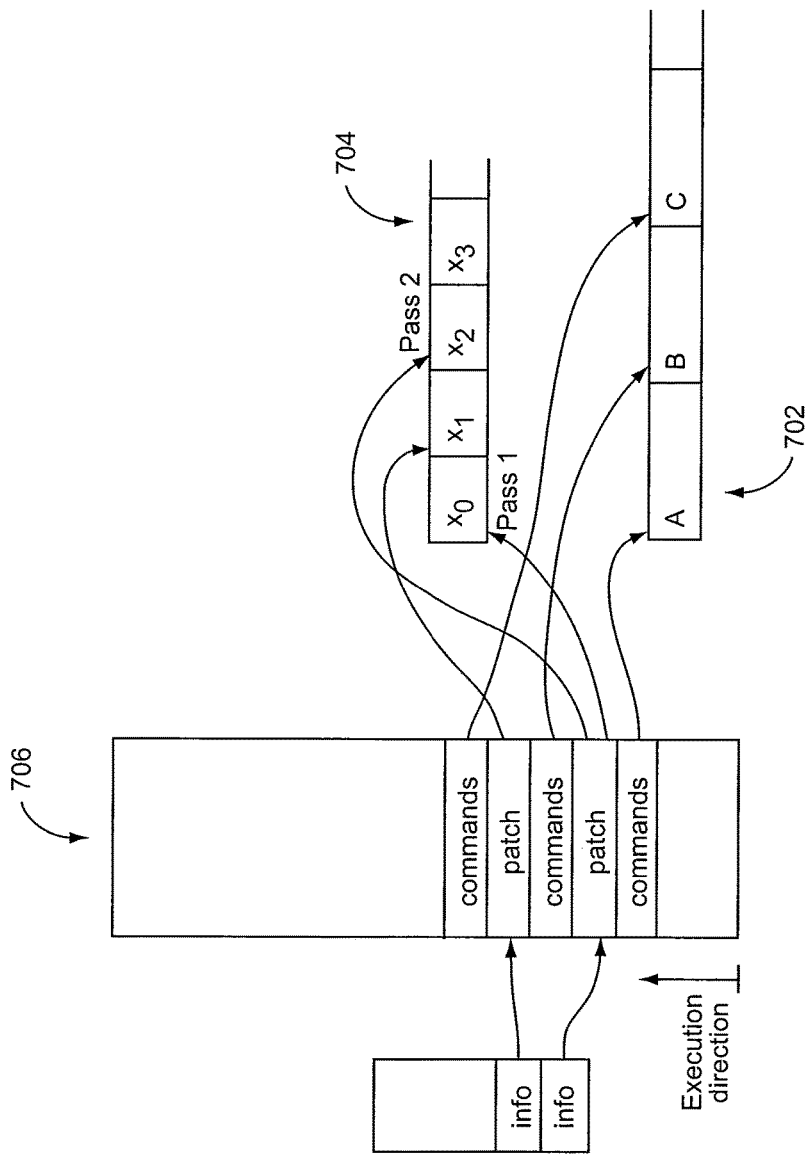
FIG. 7 is a conceptual diagram illustrating a command list for state inheritance, according to one embodiment of the invention.

FIG. 7 is a conceptual diagram illustrating a command list 706 for state inheritance, according to one embodiment of the invention. The command list 706 may include a series of tokens. In one embodiment, each token is associated with a pointer to a buffer of commands.

In some embodiments, the command list 706 alternates between a token associated with application commands and a token associated with patch methods, as described herein. In the embodiment shown in FIG. 7, the tokens in command list 706 comprise pointers to buffers 702, 704. Buffers 702, 704 each store commands, also referred to as "methods," to be executed by an execution unit, such as, e.g., PPU 202 or a CPU core. In one embodiment, buffer 702 includes "regular" application commands included in the thread to be executed, and buffer 704 includes "patch" methods that are utilized to set the processor state to the appropriate state for subsequent commands executed by the processing unit.

In some embodiments, a driver is configured to set the pointers included in the command list 706 and store commands in the buffers 702, 704. The driver sequentially walks through the commands in the thread, and stores the commands that are executed using the current processor state in block A in buffer 702. Once the driver encounters a command that depends on a different processor state, the driver stops storing commands in block A. Instead, the driver stores one or more patch methods at block $x_0$ in buffer 704, where the commands/methods stored in block $x_0$ are configured to modify the processor state into the form expected by subsequent commands in the thread. Once the patching methods are stored in buffer 704, the driver continues to store commands included in the thread in buffer 702 at the next available block, i.e., block B. This process is repeated until all of the commands in the thread are stored in buffer 702 and the required patch methods are stored in buffer 704.

At execute, the processing unit encounters a block of patch commands and generates a patch. The patch is then inserted into the command queue. While building the command list, the driver only writes into buffers 702 and 706. The "patch" entries in 706 describe what kind of state information is needed by the subsequent entries. When a command list is submitted for execution—typically on a master thread—the patch entries are used to write the patch methods into buffer 704. The insertion into the command queue is virtual: the command queue is just a sequence of pointers to buffer segments containing methods, so it would point to segments {A, x0, B, x1, . . . }.

As shown, the command list 706 alternates between pointers to commands to be executed and patch methods. Pointers stored in the command list 706 point to either blocks of thread commands in buffer 702 or blocks of patch methods in buffer 704. As also shown, the blocks in buffer 704 and/or buffer 702 can be reused on subsequent passes through the command list. For example, as shown, on a first pass, a particular patch method pointer in the command list 706 may point to block $x_0$, but on a subsequent pass, the same pointer may point to block $x_2$. Using the example shown in FIG. 7, the sequence of blocks to be executed by the processing unit may be, for example:

>A, $x_0$, B, $x_1$, C . . . A, $x_2$, B . . .

In some embodiments, better efficiency is achieved when there are fewer patches and each patch is as small as possible, i.e., fewer commands/methods per patch. Some embodiments of the invention include one or more commands, described below, that are configured to more efficiently perform the state patching described above. Accordingly, embodiments of the invention are associated with adding one or more additional parameters to the "state" of the processing unit, and providing hardware-based techniques for modifying the one or more additional parameters.

1. Index Buffer Format

In one embodiment, index buffer format is added as a parameter of processor state in the hardware. For example, when the hardware draws an index triangle list, the index may be a 16-bit or 32-bit index. In conventional approaches, such as DX11, older hardware required index size to be encoded in the draw method since the draw command depends on the index size. Accordingly, in DX11, a patch is required for each draw command encountered.

Instead, embodiments of the invention include index buffer format as a parameter of processor state. Thus, a draw command does not need to include the index size with the draw command. The processing unit can simply reference the state parameter associated with index buffer format when executing the draw command. To modify the state parameter associated with index buffer format a single SetIndexBuffer( ) method that has an IndexSize field may be implemented.

2. Primitive Topology

In conventional approaches, primitive topology was not included as part of the processor state in the hardware. Thus, for each draw command, the primitive topology (e.g., triangles, triangle strip, lines, etc.) associated with the draw command would need to be included in the draw command. According to embodiments of the invention, the primitive topology is added as a state parameter and does not need to be included as part of the draw command. However, the current setting of the primitive topology parameter may not be known to the processing unit when the processing unit receives a draw command. Embodiments of the invention, therefore, implement a single method SetPrimitiveTopology( ) to set the primitive topology, rather than requiring the driver to include the primitive topology as part a draw command (or part of the Begin method).

3. User Clip Plane Enables

Certain programmable shader units that process vertices allow a user to write up to N different clip distance outputs. For example, N may be equal to 8. To perform clipping, the shader unit may evaluate a position of a vertex relative to a particular clip plane. Each clip plane splits up the scene into areas where vertices should be drawn and areas where vertices should be cut away and not drawn. If a vertex has a positive value relative to the clip plane, then the vertex is on the "right" side of plane and should be drawn. If a vertex has a negative value relative to the clip plane, then the vertex is on the "wrong" side of plane and should not be drawn.

As described, in one embodiment, one or more shader stages in a geometry processing pipeline could write clip distances. The clip distances written by the last enabled shader stage are used for clipping; clip distances written by prior stages are simply inputs to their subsequent stage. When implementing state inheritance across command lists, different threads can "hook up" or utilize different shaders. Accordingly, embodiments of the invention provide techniques for automatically determining which is the last shader used. Based on the clipping information associated with that shader, the hardware can determine which clip distances have been written (i.e., are candidates for being clipped to). With state inheritance across command lists, while the driver is building a command list, the driver does not know which stages are enabled. Thus, the driver does not know what is the last enabled stage. The driver, therefore, cannot tell the hardware the clip distances of which stage to use for clipping.

Additionally, in some embodiments, an enable bit may be associated with each of the N different clip distance outputs associated with a particular command. This set of N enable bits can be logically ANDED with the clipping information associated with the last shader used to configure the shader.

For example, a programmable processing pipeline may include a vertex shader that processes points and determines the position of the vertex, and a geometry shader that operates on full primitives. In a first configuration, the programmable processing pipeline may be configured so that the geometry shader is invoked after the vertex shader in the pipeline. Accordingly, the clip distances are set by the last stage, i.e., the geometry shader. In a second configuration, the programmable processing pipeline may be configured to that the geometry shader is not invoked after the vertex shader in the pipeline (i.e., null geometry shader). In the second configuration where there is no geometry shader, the clip distances are set by the vertex shader. Embodiments of the invention, therefore, implement a single method SetUserClipEnable( ) that includes a separate enable bit for each user clipping plane. As described, this set of N enable bits can be logically ANDED with the clipping information associated with the last shader used.

4. Predicating Rendering Override

Sometimes the driver needs to push/pop predication state for "internal" blits, such as shader/texheader/sampler upload or for operations that are supposed to ignore predication. For example, the driver may need to do internal draw calls to accomplish certain actions that do not correspond to draw commands from the application.

Accordingly, the current predication state needs to be known in order to restore it following the internal operations. Embodiments of the invention add a SetRenderEnableOverride( ) method to the API to override the current predication state, giving us a one level stack for push/pop of the predication state.

Figure 8:
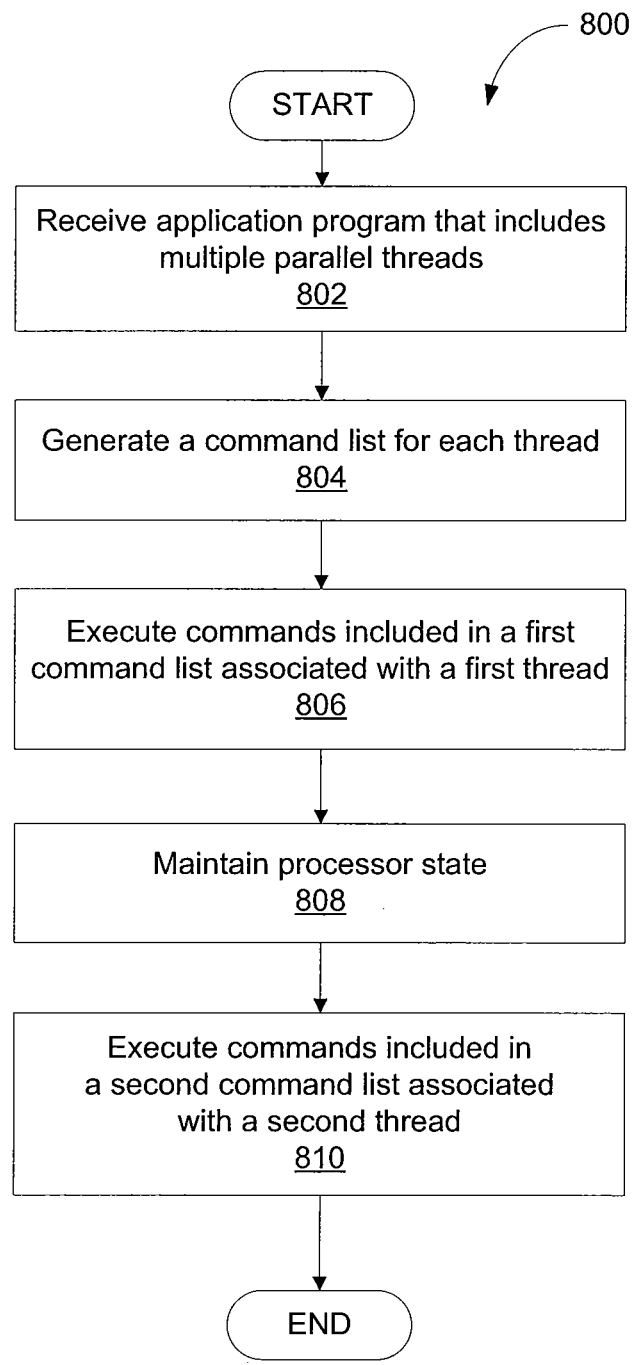
FIG. 8 is a flow diagram of method steps for multi-threaded processing with state inheritance across command lists, according to one embodiment of the invention.

FIG. 8 is a flow diagram of method steps for multi-threaded processing with state inheritance across command lists, according to one embodiment of the invention. Persons skilled in the art will understand that, even though the method 800 is described in conjunction with the systems of FIGS. 1-7, any system configured to perform the method steps, in any order, is within the scope of embodiments of the invention.

As shown, the method 800 begins at step 802, where a driver executed by a processor receives an application program that includes multiple parallel threads. As described in FIG. 5, the application program may be written by an application developer. At step 804, the driver generates a command list for each thread. As described above in FIG. 7, each command list may alternate between pointers to a buffer of application commands and pointers to a buffer of patch methods. Step 804 is described in greater detail in FIG. 9, below.

At step 806, a processing unit executes the commands included in a first command list associated with a first thread. In some embodiments, the processing unit executes the commands utilizing one or more processing stages included in a processing pipeline. For example, as shown in FIG. 7, the processing unit receives commands included in various buffers 702, 704. The processing unit may first execute the application commands in block A from buffer 702, then execute the patch methods in block $x_0$ from buffer 704, then execute the application commands in block B from buffer 702, and so on. At the end of the command list, the processing unit stops executing commands from the first thread's command list and switches to executing commands from a second thread's command list.

At step 808, a driver maintains the processor state when the processing unit stops executing commands from the first thread's command list. As described, the processor state is defined as the set of parameters associated with a processing unit that executes commands. Examples of parameters included in the processor state include a selection of a vertex shader, a geometry shader, a pixel shader, or the like, a set of different textures bound to a pixel shader, a parameter defining how blending is performed, a list of target rendering surfaces, among others. At step 810, the processing unit executes the commands included in a second command list associated with a second thread. Step 810 is substantially similar step 806 described above. Accordingly, the processor implements state inheritance across command lists.

Figure 9:
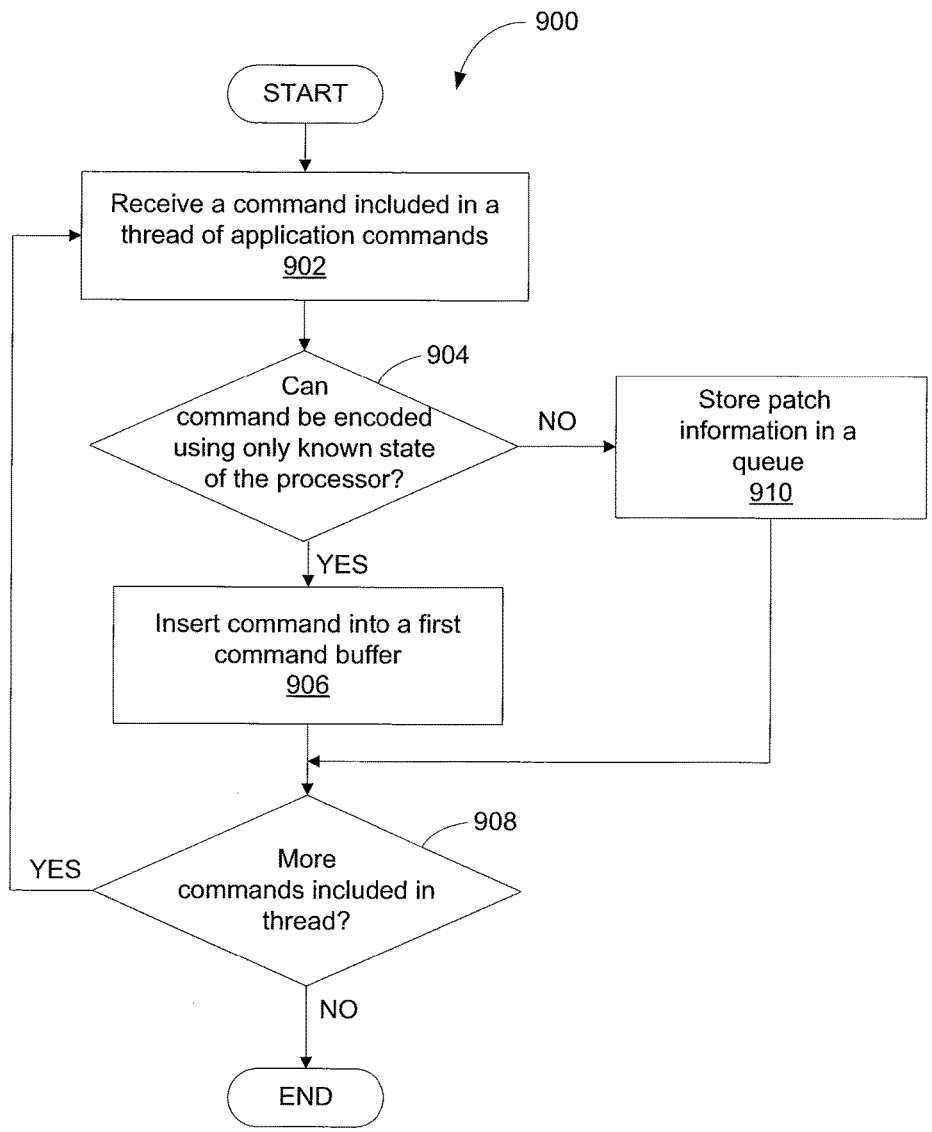
FIG. 9 is a flow diagram of method steps for generating a command list, according to one embodiment of the invention.

FIG. 9 is a flow diagram of method steps for generating a command list, according to one embodiment of the invention. Persons skilled in the art will understand that, even though the method 900 is described in conjunction with the systems of FIGS. 1-7, any system configured to perform the method steps, in any order, is within the scope of embodiments of the invention.

As shown, the method 900 begins at step 902, where the driver receives a command included in a thread of application commands. As described in FIG. 5, the application program may be written by an application developer and may include multiple parallel threads. As described in FIG. 8, at step 804, a command list is generated for each of the parallel threads.

At step 906, the driver determines whether the command can be encoded using only the known state of the processor. What matters is whether the driver knows enough about the execution-time processor state to generate the methods (i.e., hardware representation of the command). Some methods can be written without knowing any other processor state. Other methods depend on other processor state, but that processor state is known as the driver is building the command list. Either of these can be written into the command buffer immediately during command list construction. If the encoding of a method depends on other state, and that state is not known while constructing the command list, then that method cannot be written to the command buffer at this time—it must be deferred until the command list is executed and the execution-time state is known.

If the driver determines that determines that the command can be encoded using only the known state of the processor, then the method 900 proceeds to step 906. At step 906, the driver inserts the command into a first command buffer associated with application commands. As shown in FIG. 7, the first command buffer, i.e., buffer 702, may be divided into blocks of application commands. A pointer to the appropriate block of application commands is then added to the command list.

At step 908, the driver determines whether more commands are included in the thread. If more commands are included in the thread, then the method 900 returns to step 902, described above. The method 900 walks through each application command included in the thread when generating the command list. If no more commands are included in the thread, then the method 900 terminates.

If, at step 904, the driver determines that the command cannot be encoded using only the known state of the processor, then the method 900 proceeds to step 910. At step 910, the driver stores information about what patch methods will be needed into a side-band queue. The queue is later processed and the patch methods are written when the command list is executed. For example, making index size an independent state parameter avoids the need for a patch. When index size is encoded in draw methods, then any draw command issued when the index size is unknown would need to be patched later. The goal is to reduce the number of patches.

In sum, embodiments of the invention provide techniques for implementing state inheritance accross command lists. Each command list alternates between pointers that point to application commands and pointers that point to patch methods. The patch methods are inserted in the command list any time an application command is encountered that depends on processor state that is unknown during command list construction.

Advantageously, better processing efficiency is achieved relative to prior art techniques that do not provide state inheritance across command lists. Since the processor does not need to be reset to the "clean-slate state" each time a different thread is executed, less processing overhead is required.

UnbindAll Method

As described above, DX11 does not allow processor state inheritance across command lists. Instead, the processor state is reset at the beginning of every command list to a so-called "clean slate state." That means that each user-mode driver thread sets all the state parameters in the processor at the beginning of the command list. In DX11, the added processing cost of resetting the processor state to the clean slate state using dozens or hundreds of commands adds inefficiencies to the system, thereby reducing overall performance.

In one embodiment, the clean slate state is essentially a set of initial conditions for all class method state where no resources are bound, e.g., no texture headers, no texture samplers, no constant buffers, and no render targets. In DX11, at the beginning of each command list, the driver will insert all the state-setting methods, to set the initial conditions. In the DX, all resources are unbound slot-by-slot, which takes 819 individual methods:

(5 shader types)*

((128 texture header bind methods per shader type)+

(16 sampler bind methods per shader type)+

(18 constant buffer bind methods per shader type))+

(9 target "bind" methods) = 819 methods

Executing 819 methods each time a different command list is executed takes up a lot of processing resources.

Accordingly, embodiments of the invention implement a UnbindAll( ) method that unbinds everything with one method. Implementing this method increases performance of the driver and reduces the required bandwidth for methods in to the GPU.

In one embodiment, each state parameter, such as texture headers, are stored in different rows of a memory unit. To implement the UnbindAll( ) method, a valid bit is appended to each row of the memory unit. To unbind all the state parameters, each valid bit is set to an invalid state.

In another embodiment, if the state parameters are stored in a cache memory, the UnbindAll( )method may be implemented by zero-ing out one or more cache lines in the cache memory. In yet another embodiment, if the state parameters are stored in a banked memory, the UnbindAll( ) method may be implemented by clearing out one or more banks at once.

Figure 10:
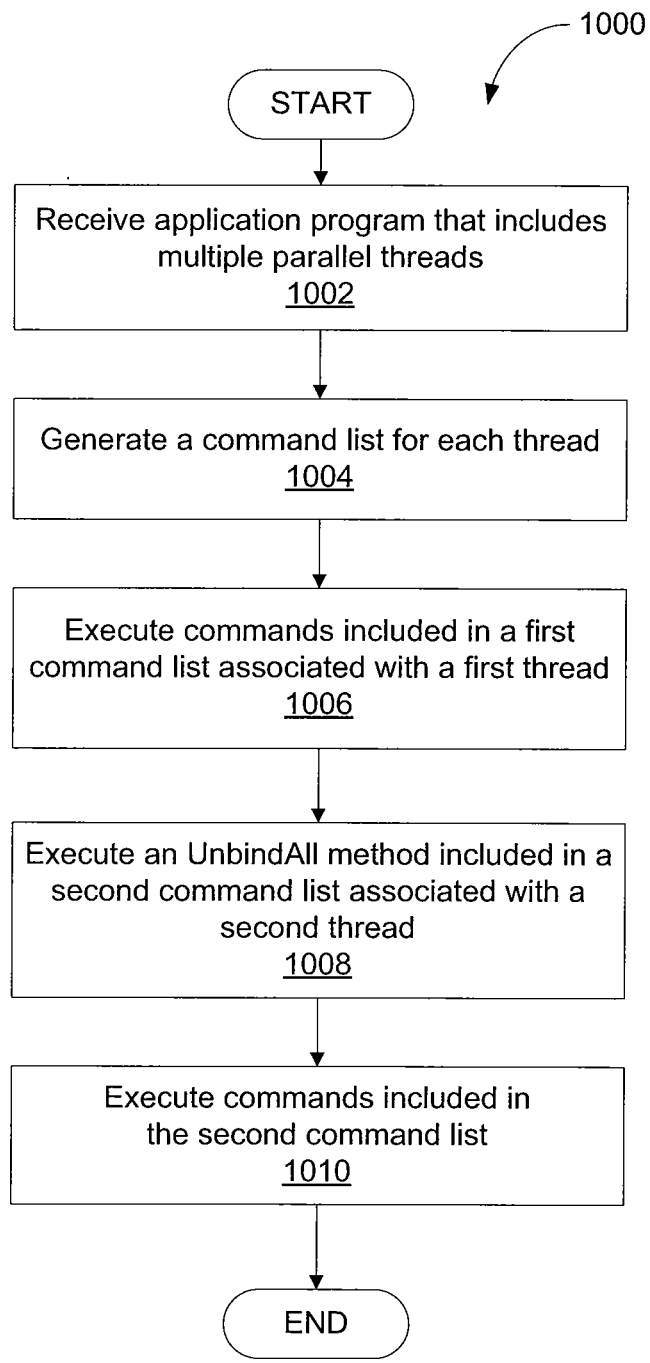
FIG. 10 is a flow diagram of method steps for implementing multi-threaded processing using an UnbindAll( ) method, according to one embodiment of the invention.

FIG. 10 is a flow diagram of method steps for implementing multi-threaded processing using an UnbindAll( )method, according to one embodiment of the invention. Persons skilled in the art will understand that, even though the method 900 is described in conjunction with the systems of FIGS. 1-7, any system configured to perform the method steps, in any order, is within the scope of embodiments of the invention.

As shown, the method 1000 begins at step 1002, where a driver receives an application program that includes multiple parallel threads. At step 1004, the driver generates a command list for each thread. At step 1006, a processor executes commands associated with a first command list that is associated with a first thread. Steps 1002, 1004, and 1006 may be substantially similar to steps 802, 804, and 806, respectively, described above.

At step 1008, the processor executes an UnbindAll( ) method included in a second command list associated with a second thread. As described, the UnbindAll( ) method unbinds all of the state parameters with one method. In one embodiment, the UnbindAll( ) method may be inserted as the first method in each command list. In another embodiment, the UnbindAll( ) method may be inserted as the last method in each command list. At step 1008, the processor executes the remaining commands associated with the second command list. Step 1010 may be substantially similar to step 810, described above.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons skilled in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

What is claimed is:

1. A method for providing an initial default state for a multi-threaded processing environment, the method comprising:
   receiving, from an application program, a plurality of separate command lists corresponding to a plurality of parallel threads associated with the application program, wherein each thread in the plurality of parallel threads generates a separate command list in the plurality of command lists;
   causing a first command list associated with a first thread included in the plurality of parallel threads to be executed by a processing unit based on a first processing state, wherein the first processing state includes a set of graphics parameters;
   after the processing unit executes the first command list, causing a second command list associated with a second thread included in the plurality of parallel threads to be executed by the processing unit based on the first processing state inherited from the first command list;
   causing a single unbind method to be executed by the processing unit, wherein the unbind method resets one or more parameters included in the set of graphics parameters to an initial processing state; and
   causing commands included in a third command list to be executed by the processing unit after the unbind method is executed.

2. The method of claim 1, wherein the processing unit comprises a graphics processing unit.

3. The method of claim 1, wherein the processing unit comprises a core of a central processing unit.

4. The method of claim 1, wherein the unbind method is sequentially the first command in the second command list to be executed by the processing unit.

5. The method of claim 1, wherein one or more rows of a memory unit are configured to store the first processing state, and further comprising setting one or more bits associated with each of the one or more rows to an invalid state.

6. The method of claim 1, wherein resetting the one or more parameters included in the set of graphics parameters comprises clearing one or more cache lines in a cache memory associated with the first processing state.

7. The method of claim 1, wherein resetting the one or more parameters included in the set of graphics parameters comprises clearing one or more banks of a banked memory associated with the first processing state.

8. The method of claim 1, wherein causing the commands included in the second command list to be executed comprises executing the commands based on the one or more parameters that have been reset to the initial processing state.

9. The method of claim 1, wherein the commands included in the first command list comprise at least one draw method to be executed by one or more stages in a graphics processing pipeline.

10. The method of claim 1, further comprising, before the unbind method is executed:
    causing commands included in a first command list associated with the second thread of the plurality of parallel threads to be executed by the processing unit; and
    switching from executing commands included in the first command list associated with the second thread to executing commands included in the third command list.

11. The method of claim 1, wherein each of the different command lists is associated with a different driver, and each different driver corresponds to a different thread in the plurality of parallel threads.

12. The method of claim 1, further comprising the steps of propagating the processing state from one command list in the different command lists to another command list in the different command lists in order to implement state inheritance across the different command lists.

13. The method of claim 1, further comprising receiving an indication from the application program that the first command list is to be executed by the processing unit.

14. A non-transitory computer-readable storage medium storing instructions that, when executed, cause a computer system to provide an initial default state for a multi-threaded processing environment, by performing the steps of:
    receiving, from an application program, a plurality of separate command lists corresponding to a plurality of parallel threads associated with the application program, wherein each thread in the plurality of parallel threads generates a separate command list in the plurality of command lists;
    causing a first command list associated with a first thread included in the plurality of parallel threads to be executed by a processing unit based on a first processing state, wherein the first processing state includes a set of graphics parameters; after the processing unit executes the first command list, causing a second command list associated with a second thread included in the plurality of parallel threads to be executed by the processing unit based on the first processing state inherited from the first command list;
    causing a single unbind method to be executed by the processing unit, wherein the unbind method resets one or more parameters included in the set of graphics parameters to an initial processing state; and
    causing commands included in a third command list to be executed by the processing unit after the unbind method is executed.

15. The computer-readable storage medium of claim 14, wherein the processing unit comprises a graphics processing unit.

16. The computer-readable storage medium of claim 14, wherein the processing unit comprises a core of a central processing unit.

17. The computer-readable storage medium of claim 14, wherein the unbind method is sequentially the first command in the second command list to be executed by the processing unit.

18. The computer-readable storage medium of claim 14, wherein one or more rows of a memory unit are configured to store the first processing state, and further comprising setting one or more bits associated with each of the one or more rows to an invalid state.

19. The computer-readable storage medium of claim 14, wherein resetting the one or more parameters included in the set of graphics parameters comprises clearing one or more cache lines in a cache memory associated with the first processing state.

20. The computer-readable storage medium of claim 14, wherein resetting the one or more parameters included in the set of graphics parameters state comprises clearing one or more banks of a banked memory associated with the first processing state.

21. A computer system, comprising:
a processor; and
a memory storing instructions that, when executed by the processor, cause the processor to provide an initial default state for a multi-threaded processing environment by performing the steps of:
- receiving, from an application program, a plurality of separate command lists corresponding to a plurality of parallel threads associated with the application program, wherein each thread in the plurality of parallel threads generates a separate command list in the plurality of command lists; and
- causing a first command list associated with a first thread included in the plurality of parallel threads to be executed by a processing unit based on a first processing state, wherein the first processing state includes a set of graphics parameters;
- after the processing unit executes the first command list, causing a second command list associated with a second thread included in the plurality of parallel threads to be executed by the processing unit based on the first processing state inherited from the first command list.

22. The computer system of claim 21, wherein the processing unit comprises a graphics processing unit or a core of a central processing unit.

23. The system of claim 21, wherein the processor further performs the steps of:
- causing a single unbind method to be executed by the processing unit, wherein the unbind method resets one or more parameters included in the set of graphics parameters to an initial processing state; and
- causing commands included in a third command list to be executed by the processing unit after the unbind method is executed.

24. The computer system of claim 23, wherein the unbind method is sequentially the first command in the second command list to be executed by the processing unit.

25. The computer system of claim 23, further comprising a second memory having one or more rows configured to store the first processing state, wherein resetting the one or more parameters included in the set of graphics parameters comprises setting one or more bits associated with each of the one or more rows to an invalid state.

26. The computer system of claim 23, further comprising a cache memory having one or more cache lines configured to store the first processing state, wherein resetting the one or more parameters included in the set of graphics parameters comprises clearing the one or more cache lines.

27. The computer system of claim 23, further comprising a banked memory having one or more banks configured to store the first processing state, wherein resetting the one or more parameters included in the set of graphics parameters comprises clearing the one or more banks.

* * * * *